(12) United States Patent
Funakoshi et al.

(10) Patent No.: US 9,591,332 B2
(45) Date of Patent: Mar. 7, 2017

(54) IMAGE PROCESSING APPARATUS PERFORMING PREPROCESSING TO PREVENT BOUNDARY POSITIONS OF DIVIDED RECTANGULAR REGIONS OF IMAGE DATA FROM BEING SEPARATED INTO DENSE AND SPARSE PORTIONS

(71) Applicant: OLYMPUS CORPORATION, Tokyo (JP)

(72) Inventors: Naoto Funakoshi, Tokyo (JP); Akira Ueno, Tokyo (JP); Yoshinobu Tanaka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 26 days.

(21) Appl. No.: 14/677,379

(22) Filed: Apr. 2, 2015

(65) Prior Publication Data
US 2015/0334394 A1 Nov. 19, 2015

(30) Foreign Application Priority Data
May 15, 2014 (JP) .................................. 2014-101681

(51) Int. Cl.
| | | |
|---|---|---|
| G06K 9/36 | (2006.01) | |
| G06K 9/46 | (2006.01) | |
| H04N 19/86 | (2014.01) | |
| H04N 19/119 | (2014.01) | |
| H04N 19/172 | (2014.01) | |

(52) U.S. Cl.
CPC ......... H04N 19/865 (2014.11); H04N 19/119 (2014.11); H04N 19/172 (2014.11)

(58) Field of Classification Search
None
See application file for complete search history.

(56) References Cited

U.S. PATENT DOCUMENTS

2014/0140391 A1* 5/2014 Eshima .................. H04N 19/46
375/240.01

FOREIGN PATENT DOCUMENTS

| JP | 04-269084 A | 9/1992 |
|---|---|---|
| JP | 2006-332955 A | 12/2006 |

* cited by examiner

Primary Examiner — Feng Niu
(74) Attorney, Agent, or Firm — Westerman, Hattori, Daniels & Adrian, LLP

(57) ABSTRACT

An image processing apparatus that includes a dummy region adding section configured to add a dummy region to an end part of image data and a dividing position determining section configured to randomly determine a dividing position at which the image data is divided into a plurality of pieces of rectangular image data having the same shape. The image processing apparatus also includes a dividing section configured to divide the image data into the plurality of pieces of rectangular image data based on the dividing position determined by the dividing position determining section and a compressing section configured to compress the plurality of pieces of rectangular image data obtained through a dividing operation of the dividing section.

8 Claims, 14 Drawing Sheets

IMAGE PROCESSING APPARATUS PERFORMING PREPROCESSING TO PREVENT BOUNDARY POSITIONS OF DIVIDED RECTANGULAR REGIONS OF IMAGE DATA FROM BEING SEPARATED INTO DENSE AND SPARSE PORTIONS

BACKGROUND OF THE INVENTION

Field of the Invention

The present invention relates to an image processing apparatus.

Priority is claimed on Japanese Patent Application No. 2014-101681, filed May 15, 2014, the content of which is incorporated herein by reference.

Description of Related Art

In image processing apparatuses such as digital cameras, image compression technology is adopted in accordance with recently increasing pixel density. In addition, although technology for compressing YCbCr data represented, by Joint Photographic Experts Group (JPEG) or the like is generally known in relation to image compression, a large number of technologies for compressing RAW data have also recently been adopted.

In addition, it is known that compression is efficiently enabled by dividing image data into a plurality of image regions and selecting a compression parameter in each image region to perform a compression process (for example, see the publication of Japanese Unexamined Patent Application, First Publication No. 2006-332955).

In the content disclosed in the publication of Japanese Unexamined Patent Application, First Publication No. 2006-332955, as shown in FIG. 20, a frame is divided into rectangular regions each having 10 pixels×10 pixels, and RAW data is compressed for every rectangular region. It is possible to perform an optimum compression process for every rectangular region by compressing data for every rectangular region in this manner. Thus, a more efficient compression process is possible. However, because the compression process is performed for every rectangular region, image data near a boundary of the rectangular region is likely to be discontinuous. As a result, an unintended pattern may appear near the boundary of the rectangular region.

In recent years, the high pixel density has been used increasingly for moving images as well and the number of cases in which compression technology is adopted for moving images is increasing. In such cases, degradation of image quality that is inconspicuous in still images may appear in moving images. In particular, in moving images in which motion between frames is small, image degradation near a boundary tends to appear as flickering.

Therefore, technology capable of reducing degradation of image quality near a boundary of an image region by shifting a separating position of the image region in a horizontal or vertical direction when image data is divided into a plurality of image regions and a compression process is performed for every image region is known (for example, see the publication of Japanese Unexamined Patent Application, First Publication No H04-26904).

In the content disclosed in the publication of Japanese Unexamined Patent Application, First Publication No. H04-269084, as shown in FIGS. 21A and 21B, degradation of image quality near a boundary of a rectangle is reduced by separating a frame into rectangular blocks, alternately shifting every line in a horizontal or vertical direction, and shifting a boundary portion of the rectangle with a previous line.

Also, in the method disclosed in the publication of Japanese Unexamined Parent Application, First Publication. No. H04-269084, the reduction effect of image quality degradation near the boundary of the rectangle may be weakened because there are a dense portion and a sparse portion of a boundary position of a rectangular block. For example, as shown in FIG. 22, when the frame is separated into rectangular blocks by alternately shifting every line in a horizontal direction, there are a dense portion (for example, a region 932) and a sparse portion (for example, a region 931) of the boundary position. In addition, variation in the image quality within the frame in which the degradation of image quality is remarkable in the dense portion of the boundary position and the degradation of image quality is not visible in the sparse portion of the boundary position occurs. Thus, consequently, the degradation of image quality near the boundary may be conspicuous.

SUMMARY OF THE INVENTION

According to a first aspect of the present invention, an image processing apparatus includes: a dummy region adding section configured to add a dummy region to an end part of image data; a dividing position determining section configured to randomly determine a dividing position at which the image data is divided into a plurality of pieces of rectangular image data having the same shape; a dividing section configured to divide the image data into the plurality of pieces of rectangular image data based on the dividing position determined by the dividing position determining section; and a compressing section configured to compress the plurality of pieces of rectangular image data obtained through a dividing operation of the dividing section.

According to a second aspect of the present invention, in the image processing apparatus according to the first aspect, the dummy region adding section may add the dummy region using peripheral pixel data output by an imager.

According to a third aspect of the present invention, in the image processing apparatus according to the first aspect, the dummy region adding section may add the dummy region using a fixed value.

According to a fourth aspect of the present invention, in the image processing apparatus according to the second aspect, the dummy region adding section may add the dummy region using the image data near the dummy region.

According to a fifth aspect of the present invention, in the image processing apparatus according to the first aspect, the dummy region adding section may add the dummy region using an optical black region of an imager. The compressing section may not compress the dummy region.

According to a sixth aspect of the present invention, in the image processing apparatus according to any one of the first aspect to the fifth aspect, the image data may be a frame constituting a moving image. The dividing position determining section randomly may determine the dividing position for every frame.

According to a seventh aspect of the present invention, an image processing apparatus includes: a decompressing section configured to decompress compressed rectangular image data compressed after dividing image data into a plurality of pieces of rectangular image data; and an image data restoration section configured to generate the image data after deleting a dummy region from the plurality of pieces of rectangular image data decompressed by the decompressing section.

DETAILED DESCRIPTION OF THE INVENTION

First Embodiment

Figure 1:
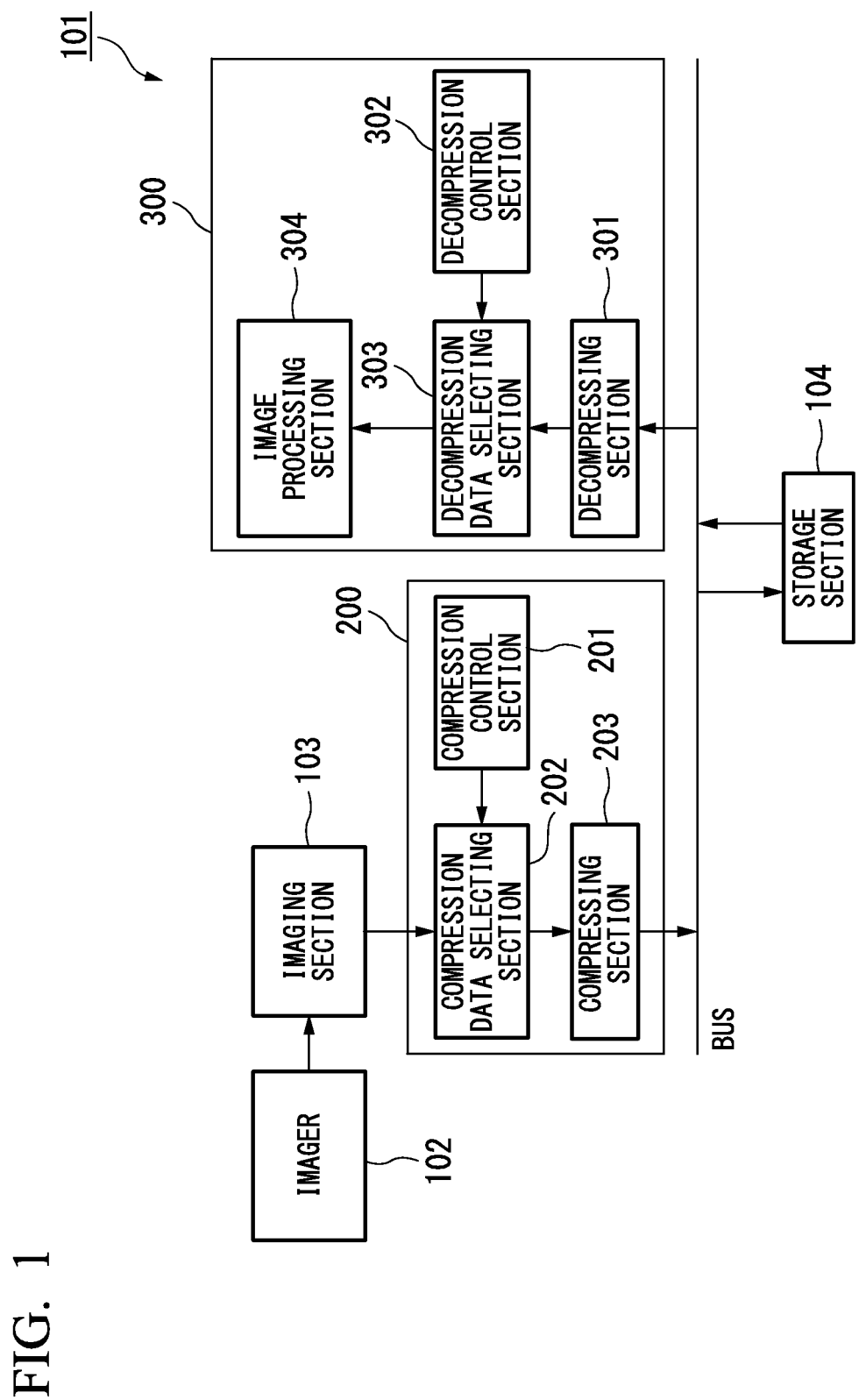
FIG. 1 is a block diagram showing a configuration of an imaging apparatus in a first embodiment of the present invention.

Hereinafter, the first embodiment of the present invention will be described with reference to the drawings. First, a configuration of an imaging apparatus will be described. FIG. 1 is a block diagram showing a configuration of the imaging apparatus 101 in this embodiment. The imaging apparatus 101 includes an image compressing apparatus (image processing apparatus) 200, an image decompressing apparatus (image processing apparatus) 300, an imager 102, an imaging section 103, and a storage section 104.

The imager 102, for example, is a complementary metal oxide semiconductor (CMOS) imager sensor or a charge coupled device (CCD) image sensor that converts light from a lens (not shown) into an electric signal and outputs the electric signal. The imaging section 103 generates image data based on the electric signal output from the imager 102. The image compressing apparatus 200 includes a compression control section 201 (dividing position determining section), a compression data selecting section 202 (a dummy region adding section and a dividing section), and a compressing section 203. The image compressing apparatus 200 compresses image data generated by the imaging section 103 and generates the compressed image data. A method of generating the compressed image data will be described later.

The storage section 104 stores data to be used by each section provided in the imaging apparatus 101. For example, the storage section 104 stores the compressed image data generated by the image compressing apparatus 200. The image decompressing apparatus 300 includes a decompressing section 301, a decompression control section 302, a decompression data selecting section 303 (image data restoration section), and an image processing section 304 (image data restoration section). The image decompressing apparatus 300 decompresses the compressed image data stored by the storage section 104 and generates the image data. A method of generating the image data will be described later.

Next, a method in which the image compressing apparatus 200 generates the compressed image data will be described. The compression method by the image compressing apparatus 200 is specifically performed in the following procedure. First, the compression control section 201 randomly determines a dividing position of rectangular image data. Subsequently, the compression data selecting section 202 divides image data into a plurality of pieces of rectangular image data based on the dividing position determined by the compression control section 201. Thereafter, the compressing section 203 performs a compression process for every piece of the rectangular image data obtained through a dividing operation of the compression data selecting section 202.

In this manner, in this embodiment, the image compressing apparatus 200 divides the image data into the rectangular image data and compresses data for every piece of the rectangular image data. In addition, in this embodiment, the dividing position of the rectangular image data is randomly determined when the image data is divided into the rectangular image data. Thereby, it is possible to eliminate dense and sparse portions of the boundary position of the rectangular region while an optimum compression process is performed for every rectangular region. Consequently, it is possible to further suppress the degradation of image quality even when the compression process is performed after image data is divided into a plurality of regions.

Figure 2:
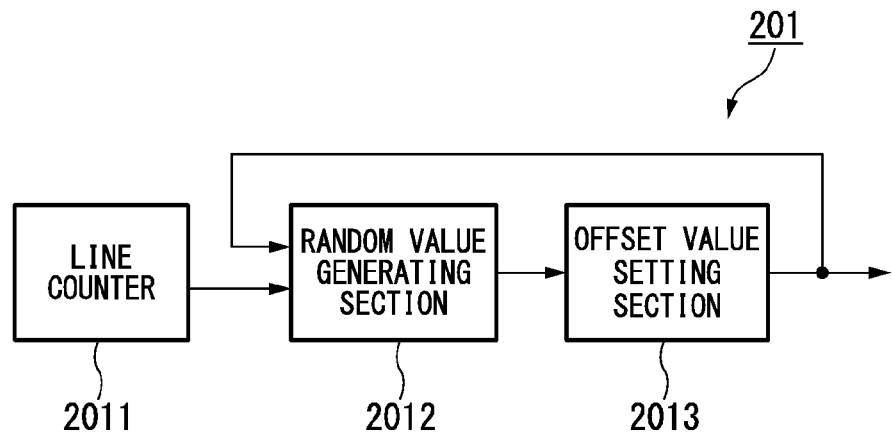
FIG. 2 is a block diagram showing a configuration of a compression control section in the first embodiment of the present invention.

FIG. 2 is a block diagram showing a configuration of a compression control section 201 in this embodiment. In the example shown, the compression control section 201 includes a line counter 2011, a random value generating section 2012, and an offset value setting section 2013. The line counter 2011 counts lines of image data. The random value generating section 2012 generates a random value. The offset value setting section 2013 sets an offset value of a line counted by the line counter 2011 as the random value generated by the random value generating section 2012.

Figure 3:
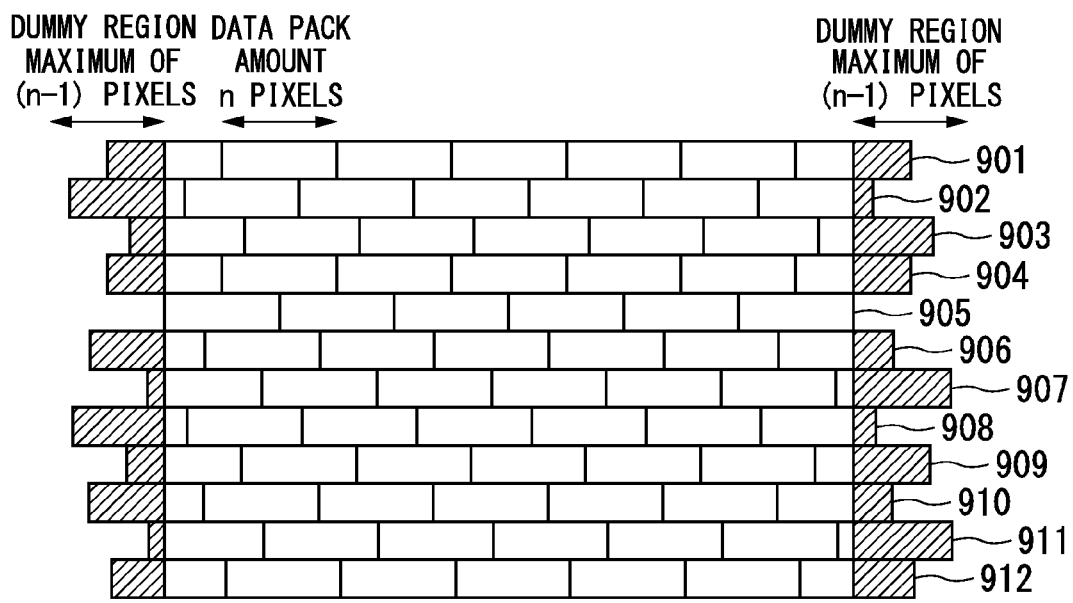
FIG. 3 is a schematic diagram showing an example in which image data is divided into rectangular image data in the first embodiment of the present invention.

Hereinafter, an example in which image data is divided will be described. FIG. 3 is a schematic diagram showing an example in which image data is divided into rectangular image data in this embodiment. In the example shown, the image data is divided into 12 lines 901 to 912. Also, the number of division lines is not limited to 12, and any number of lines may be used as long as the number of lines is 2 or more. In addition, the number of division lines may be predetermined or arbitrarily set.

In addition, in the example shown, a data pack amount (the number of pixels of image data in the horizontal direction) is set as n pixels. In addition, the data pack amount is not limited to the n pixels and may be any arbitrary number of pixels. In addition, the data pack amount may be predetermined or arbitrarily set. In addition, when the data pack amount is n pixels, the random value generated by the random value generating section 2012 is any integer 1 to n−1. In addition, when the data pack amount is n pixels, the number of pixels of the dummy region in the horizontal direction is a maximum of n−1 pixels.

That is, when image data is separated into rectangular image data as shown in FIG. 3, the compression control section 201 generates an offset value of the next line by iteratively adding the random value (any integer 1 to n−1) to the offset value of a current line every time the line counter 2011 counts up.

The compression data selecting section 202 starts to read image data from a position designated by the offset value based on the offset value generated by the compression control section 201 and the data pack amount, divides the read image data as rectangular image data at a point in time at which data of the data pack amount is accumulated, and transmits the rectangular image data to the compressing section 203. For example, when the offset value is x, the compression data selecting section 202 starts the reading of image data from a position x pixels back (offset position), divides the read image as rectangular image data at a point in time at which data of the data pack amount is accumulated, and transmits the rectangular image data to tire compressing section 203.

Also, it may be necessary to add a dummy region to the rectangular image data of a left end of each line and the rectangular image data of a right end of each line in order to set shapes of all rectangular image data as the same shape. Therefore, the compression data selecting section 202 adds the dummy region when data is divided into rectangular image data if it is necessary to add the dummy region.

Figure 4A:
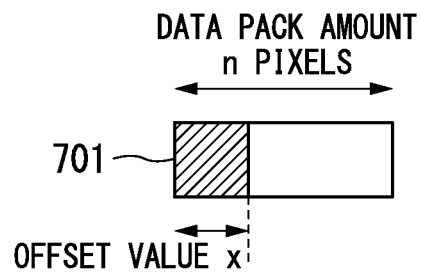
FIG. 4A is a schematic diagram showing an example of rectangular image data of a left end of a line in the first embodiment of the present invention.
Figure 4B:
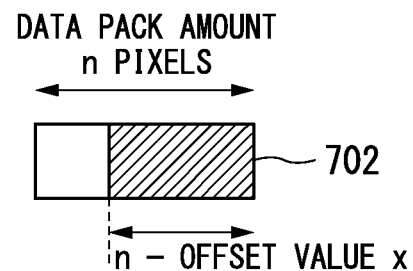
FIG. 4B is a schematic diagram showing an example of rectangular image data of a right end of a line in the first embodiment of the present invention.

FIGS. 4A and 4B are schematic diagrams showing an example of rectangular image data of a left end of a line and an example of rectangular image data of a right end of a line, respectively. FIG. 4 shows rectangular image data of the left end of the line when the offset value is x. As shown, because the offset value is x, a dummy region 701 of x pixels in the horizontal direction is added to the rectangular image data of the left end of the line. In addition, because the offset value is x, a dummy region 702 of (n−x) pixels is added to the rectangular image data of the right end of the line. Also, it is unnecessary to add a dummy region to the rectangular image data of the right end and the rectangular image data of the left end of the line having an offset value of 0.

As a method of adding the dummy region, for example, there are the following four methods.

Figure 5:
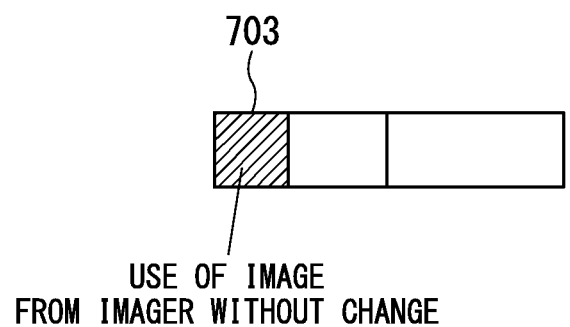
FIG. 5 shows an example of rectangular image data when image data from an imager is used as image data of a dummy region without change in the first embodiment of the present invention.

(a) When there is a margin in a valid region of the imager 102, image data from the imager 102 is used as a dummy region without change. FIG. 5 shows an example of rectangular image data when image data from the imager 102 is used as image data of the dummy region without change. In the example shown, image data of the dummy region 703 is image data from the imager 102. In this case, it is easy to simply configure the image compressing apparatus 200 because it is not necessary to divide the compression process into the compression process in the dummy region and the compression process the valid region.

Figure 6:
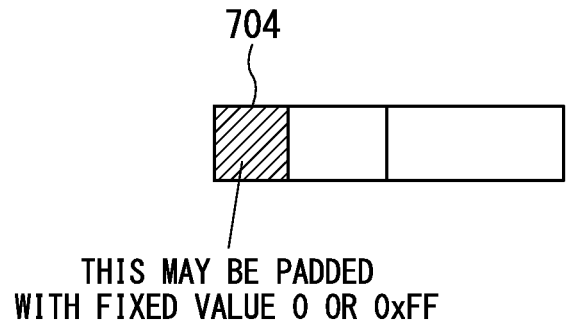
FIG. 6 shows an example of rectangular image data when a value of a dummy region is padded with a fixed value in the first embodiment of the present invention.

(b) A value of the dummy region is padded with a fixed value 0, 0xFF, or the like. FIG. 6 shows an example of rectangular image data when a value of a dummy region is padded with a fixed value. In the example shown, image data of a dummy region 704 is the fixed value. In this case, it is possible to add the dummy region 704 even when image data from the imager 102 is not input for the dummy region 704. This method, for example, is particularly effective when there is no margin in a blanking time.

Figure 7:
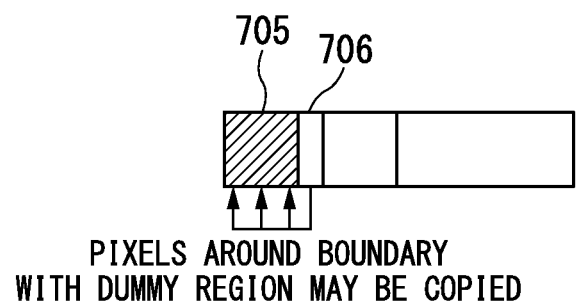
FIG. 7 shows an example of rectangular image data when image data near the dummy region is copied and used as image data of the dummy region in the first embodiment of the present invention.

(c) Pixel data near the dummy region is copied and used as image data of the dummy region. FIG. 7 shows an example of rectangular image data when image data near the dummy region is copied and used as image data of the dummy region. In the example shown, the image data of a dummy region 705 is data obtained by copying image data 706 near the dummy region 705. While there are cases in which the degradation of image quality is caused according to a compression scheme when the fixed value is used as in the method of (b), in this method, it is possible to prevent image quality from being degraded because actual image data is used.

Figure 8:
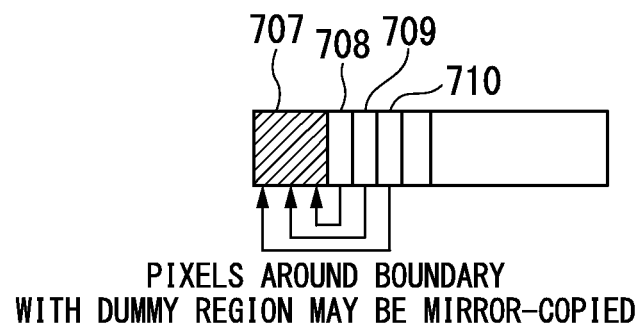
FIG. 8 shows an example of rectangular image data when image data near the dummy region is mirror-copied and used as image data of the dummy region in the first embodiment of the present invention.

(d) Image data near the dummy region is mirror-copied and used as image data of the dummy region. FIG. 8 shows an example of rectangular image data when image data near the dummy region is mirror-copied and used as image data of the dummy region. In the example shown, image data of a dummy region 707 is data obtained by mirror-copying image data 708 to 710 near the dummy region. While there are cases in which the degradation of image quality is caused according to a compression scheme when the fixed value is used as in the method of (b), in this method, it is possible to prevent image quality from being degraded because actual image data is used as in the method of (c).

As described above, it is possible to set shapes of all rectangular image data as the same shape even when rectangular image data is divided based on an offset value by adding a dummy region to the rectangular image data of a left end of each line and the rectangular image data of a right end of each line.

The compressing section 203 receives rectangular image data obtained through a dividing operation of the compression data selecting section 202 and performs a compression process for every piece of the rectangular image data. In addition, the compressing section 203 transmits the compressed rectangular image data to the storage section 104 via a bus. The storage section 104 records the plurality of pieces of the compressed rectangular image data constituting the one-image data as compressed image data.

Next, a method in which the image decompressing apparatus 300 decompresses the compressed image data will be described. The decompression method by the image decompressing apparatus 300 is specifically performed in the following procedure. First, the decompressing section 301 reads the compressed image data recorded by the storage section 104. In addition, the decompressing section 301 performs the decompression process on the compressed image data read from the storage section 104 for every piece of the rectangular image data.

Figure 9:
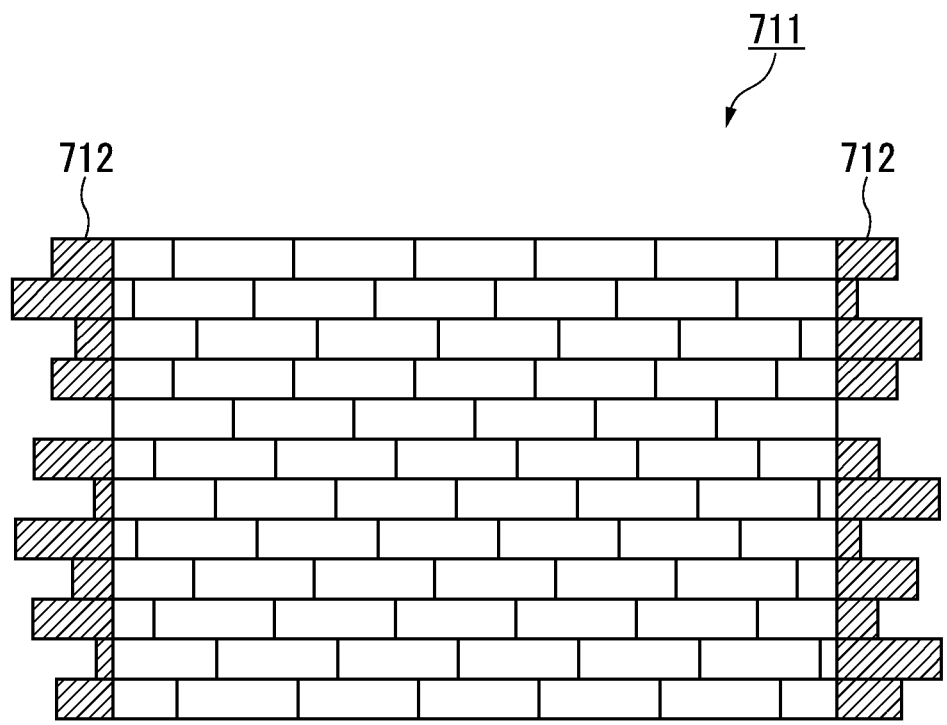
FIG. 9 is a schematic diagram showing an example of image data obtained by a decompressing section performing a decompression process on compressed image data for every piece of rectangular image data in the first embodiment of the present invention.

FIG. 9 is a schematic diagram showing an example of image data obtained by the decompressing section 301 performing a decompression process on the compressed image data for every piece of rectangular image data. As shown, a dummy region 712 is included in image data 711 on which the decompressing section 301 has performed the decompression process. Therefore, the image decompressing apparatus 300 performs a process of deleting the dummy region 712.

Specifically, the decompression control section 302 selects image data of a valid region from which the dummy region 712 is removed, from the image data 711 on which the decompressing section has performed the decompression process. For example, in the example shown in FIG. 4A, the rectangular image data of the left end of the line includes a dummy region 701 of x pixels in the horizontal direction on the left side. In addition, in the example shown in FIG. 4B, the rectangular image data of the right end of the line includes the dummy region 702 of (n−x) pixels in the horizontal direction on the right side.

At this time, it is necessary for the decompression control section 302 to acquire an offset value and a parameter of the rectangular image data used when the image compressing apparatus 200 performs the compression process in order to specify the dummy region. As a method of acquiring the offset value and the parameter of the rectangular image data used when the image compressing apparatus 200 performs the compression process, for example, there are the following two methods.

(a) The compression control section 201 and the decompression control section 302 include a random value generating section 2012 configured to generate the same random value for the same seed value. Then, an offset value and a data pack amount corresponding to the seed value are used at a compression processing time and a decompression processing time. Thereby, the decompression control section 302 can specify the dummy region.

(b) Only the compression control section 201 includes the random value generating section 2012. In this case, the compression control section 201 temporarily records the offset value and the data pack amount used at the compression processing time in the storage section 104. Then, the decompression control section 302 uses the offset value and the data pack amount react from the storage section 104 at the decompression processing time. Thereby, the decompression control section 302 can specify the dummy region.

The decompression data selecting section 303 deletes the dummy region from the rectangular image data including the dummy region based on the dummy region specified by tire decompression control section 302. Subsequently, the image processing section 304 performs image processing of a plurality of pieces of rectangular image data and generates one-image data.

Figure 10:
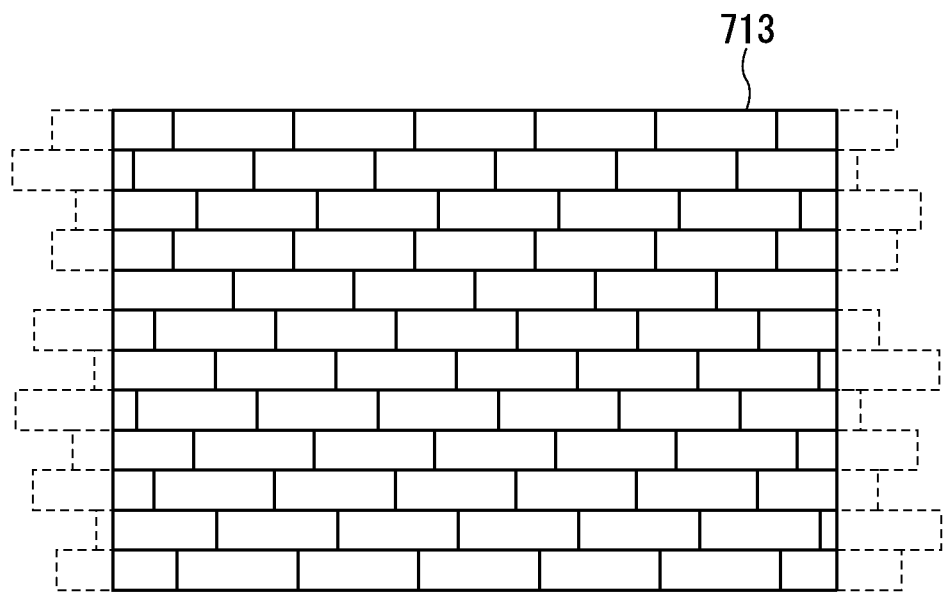
FIG. 10 is a schematic diagram showing an example of image data obtained by an image decompressing apparatus performing a decompression process on image data in the first embodiment of the present invention.

FIG. 10 is a schematic diagram showing an example of image data obtained by the image decompressing apparatus 300 performing a decompression process on image data. As shown, no dummy region is included in image data 713 on which the image decompressing apparatus 300 performs the decompression process. In this manner, according to the above-described process, the image decompressing apparatus 300 can decompress the compressed image data compressed by the image compressing apparatus 200.

Figure 11:
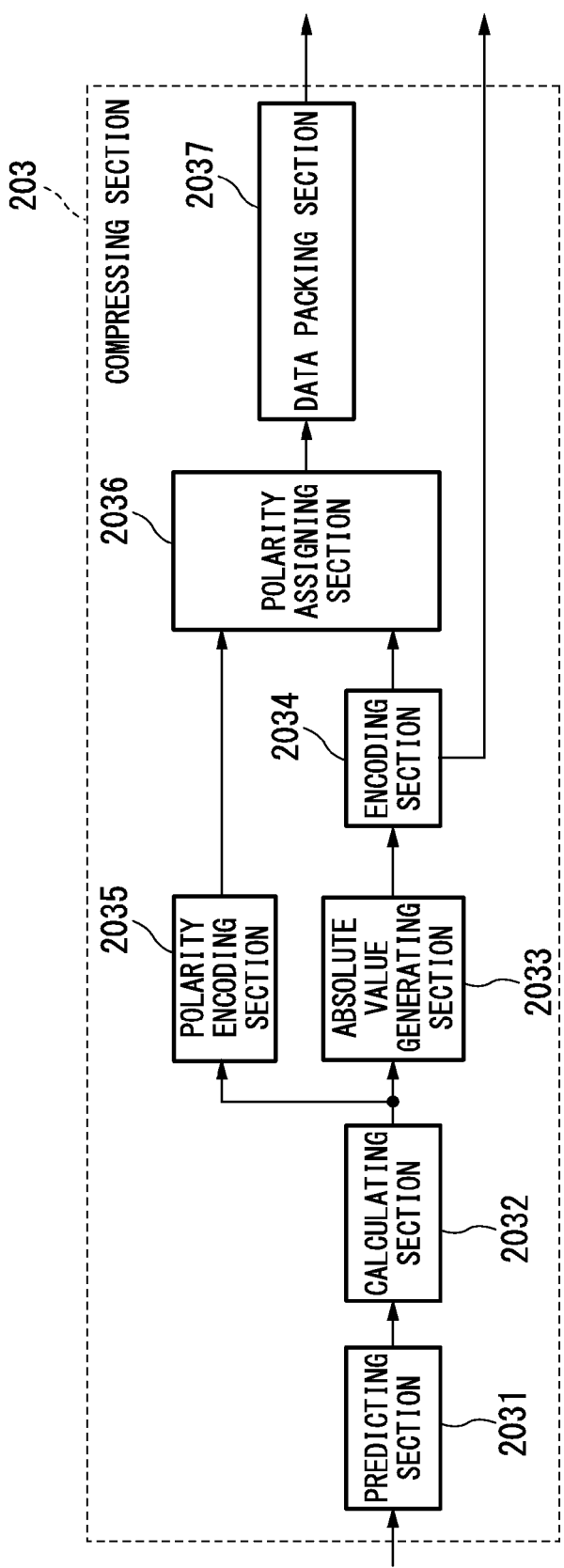
FIG. 11 is a block diagram showing a configuration of the compressing section in the first embodiment of the present invention.

Next, a specific example of the compressing section 203 will be described. FIG. 11 is a block diagram showing a configuration of the compressing section 203 in this embodiment. In the example shown, the compressing section 203 includes a predicting section 2031, a calculating section 2032, an absolute value generating section 2033, an encoding section 2034, a polarity encoding section 2035, a polarity assigning section 2036, and a data packing section 2037.

The compression process is performed in the following procedure. First, the predicting section 2031 obtains a predicted value for input rectangular image data. Subsequently, the calculating section 2032 obtains and outputs a difference between the input rectangular image data and the predicted value predicted by the predicting section 2031. Subsequently, the absolute value generating section 2033 obtains and outputs an absolute value of the difference output by the calculating section 2032. Subsequently, the encoding section 2034 encodes the absolute value output by the absolute value generating section on 2033. In addition, the encoding section 2034 outputs a prefix (encoded data of a "quotient") obtained through encoding to the polarity assigning section 2036 and outputs a suffix (encoded data of a "remainder") obtained through encoding to the storage section 104. On the other hand, the polarity encoding section 2035 encodes the polarity of the difference output by the calculating section 2032 and outputs the encoded polarity.

The polarity assigning section 2036 assigns polarity data output by the polarity encoding section 2035 to the prefix output by the encoding section 2034. Subsequently, the data packing section 2037 divides the data output by the polarity assigning section 2036 into data of predetermined amounts and outputs the divided data to the storage section 104. Here, the encoding section 2034 may perform any one of entropy encoding, Golomb-Rice encoding, and Huffman encoding and the encoding method is not particularly important.

Figure 12:
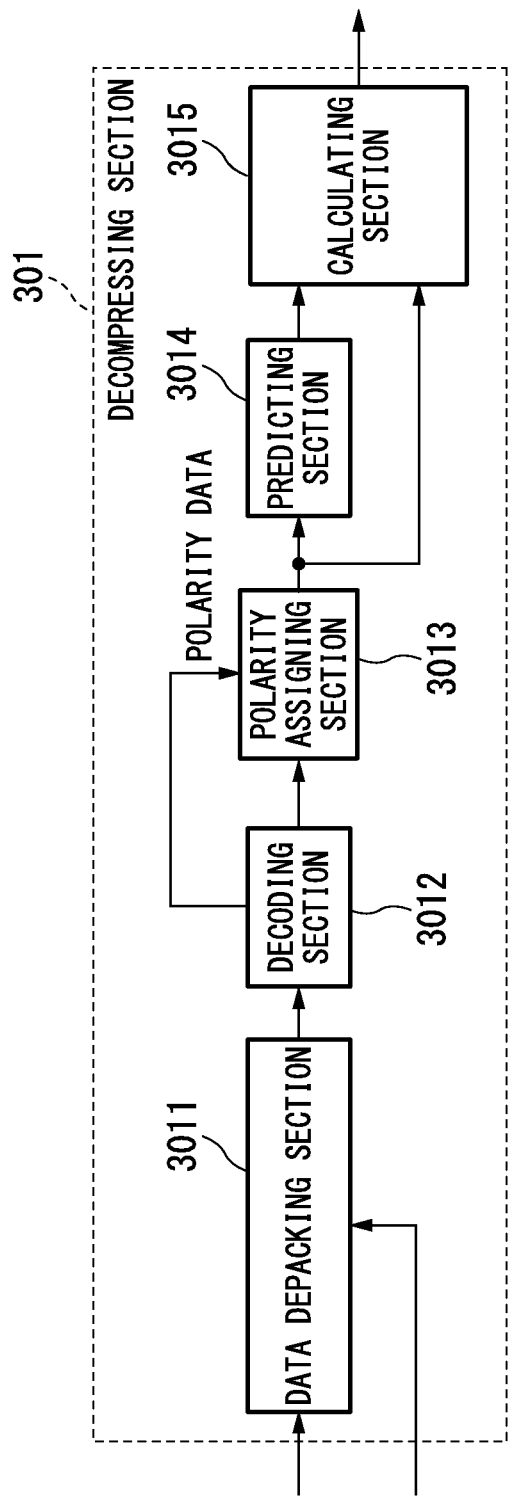
FIG. 12 is a block diagram showing a configuration of the decompressing section in the first embodiment of the present invention.

Next, a specific example of the decompressing section 301 will be described. FIG. 12 is a block diagram showing a configuration of the decompressing section 301 in this embodiment. In the example shown, the decompressing section 301 includes a data depacking section 3011, a decoding section 3012, a polarity assigning section 3013, a predicting section 3014, and a calculating section 3015.

The decompression process is performed in the following procedure. First, the data depacking section 3011 reads data compressed by the compressing section 203 from the storage section 104. The data depacking section 3011 integrates a plurality of prefixes read in units of bytes and outputs an integrated prefix to the decoding section 3012. The decoding section 3012 decodes the prefix and outputs the decoded prefix to the polarity assigning section. In addition, the decoding section 3012 extracts the polarity from the prefix and outputs the polarity to the polarity assigning section 3013.

The polarity assigning section 3013 assigns the polarity data output from the decoding section 3012 to the decoded data output from the decoding section 3012, and outputs the data to the predicting section 3014. The predicting section 3014 obtains and outputs a predicted value for data to be decoded using the data output by the polarity assigning section 3013. The calculating section 3015 restores original image data by adding the predicted value output by the predicting section 3014 and the data output by the polarity assigning section, and outputs the original image data to the decompression data selecting section 303. Here, the decoding section 3012 may perform any one of entropy decoding, Golomb-Rice decoding, and Huffman decoding and the decoding method is not particularly important.

Also, the essence of this embodiment is that a compression region is varied in various ways in order to prevent image quality from being degraded in a boundary portion of a compression unit, and the operation of the compressing section 203 or the decompressing section 301 itself is not particularly limited.

As described above, according to this embodiment, the image compressing apparatus 200 divides image data into rectangular image data and compresses data for every piece of the rectangular image data. In addition, in this embodiment, when the image data is divided into the rectangular image data, a dividing position of the rectangular image data is randomly determined. Thereby, it is possible to eliminate dense and sparse portions of a boundary position of the rectangular region while an optimum compression process is performed for every rectangular region. Consequently, it is possible to further suppress the degradation of image quality even when the compression process is performed after image data is divided into a plurality of regions.

Second Embodiment

Figure 13:
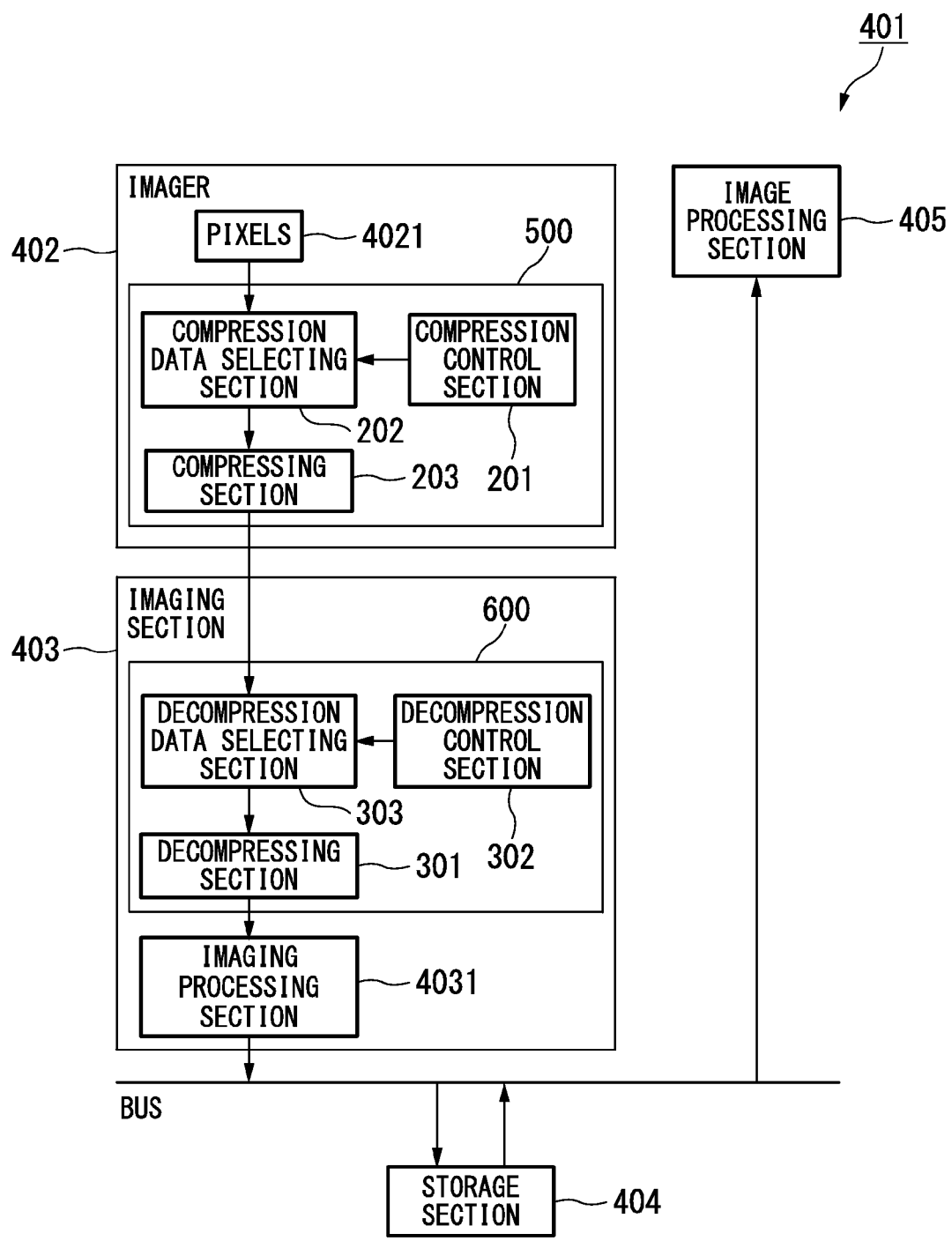
FIG. 13 is a block diagram showing a configuration of an imaging apparatus in a second embodiment of the present invention.

Next, the second embodiment of the present invention will be described. FIG. 13 is a block diagram showing a configuration of an imaging apparatus 401 in this embodiment. The imaging apparatus 401 includes an imager 402, an imaging section 403, a storage section 404, and an image processing section 405. The imager 402 includes a pixel 4021 and an image compressing apparatus (image processing apparatus) 500. The image compressing apparatus 500 includes a compression control section 201, a compression data selecting section 202, and a compressing section 203. Also, the compression control section 201, the compression data selecting section 202, and the compressing section 203 are similar to the sections of the first embodiment.

The imaging section 403 includes an image decompressing apparatus (image processing apparatus) 600 and an imaging processing section 4031. The image decompressing apparatus 600 includes a decompressing section 301, a decompression control section 302, and a decompression data selecting section 303. Also, the decompressing section 301, the decompression control section 302, and the decompression data selecting section 303 are similar to the sections of the first embodiment.

A difference between this embodiment and the first embodiment is that data from the imager 102 is directly delivered to the imaging section 103 in the first embodiment but an electric signal output by pixels 4021 within the imager 402 is compressed and delivered to the imaging section 403 in this embodiment. Then, the imaging section 403 decompresses the compressed electric signal and generates image data based on the decompressed electric signal.

Even in this case, as in the first embodiment. It is possible to apply a method of adding a dummy region to both left and right ends of original electric signal data of one-image data output by the pixels 4021, separating the electric signal data into rectangular electric signal data, and performing compression for every piece of the rectangular electric signal data.

Specifically, the image compressing apparatus 500 divides the electric signal data output by the pixels 4021 into the rectangular electric signal data and compresses data for every piece of the rectangular electric signal data. In addition, when the electric signal data is divided into the rectangular electric signal data, a dividing position of the rectangular electric signal data is randomly determined. Thereby, it is possible to eliminate dense and sparse portions of a boundary position of the rectangular region while an optimum compression process is performed for every rectangular region. Consequently, it is possible to further suppress the degradation of image quality even when the compression process is performed after electric signal data is divided into a plurality of regions. Also, the configuration and operation of the image compressing apparatus 500 are similar to the configuration and operation of the image compressing apparatus 200 in the first embodiment.

In addition, a method of decompressing the electric signal data compressed by the image compressing apparatus 500 is also similar to that of the first embodiment. That is, the configuration and operation of the image decompressing apparatus 600 are similar to the configuration and operation of the image decompressing apparatus 300 in the first embodiment.

Figure 14:
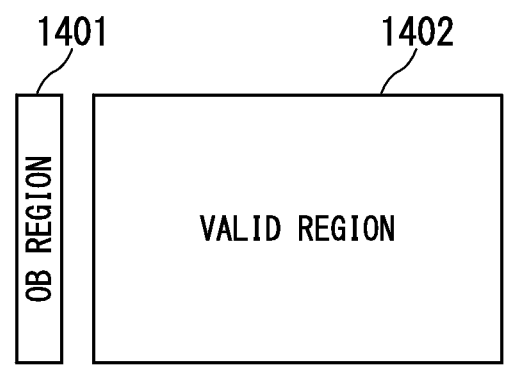
FIG. 14 is a schematic diagram showing a relationship between an optical black (OB) region and a valid region in the second embodiment of the present invention.

Also, in this embodiment, the imaging section 403 decompresses the electric signal data compressed by the imager 402 and generates image data based on the decompressed electric signal data. The imaging section 403 may perform optical black (OB) correction on the data from the imager 402 based on an OB region which is on the left side of the valid region as shown in FIG. 14. FIG. 14 is a schematic diagram showing a relationship between an OB region and a valid region in this embodiment. In the example shown, the OB region 1401 is on the left side of a valid region 1402.

If the electric signal data is separated into the rectangular electric signal data and the separated data is compressed in a state in which the OB region 1401 is included when the OB correction is performed on the data from the image 402 based on the OB region 1401, the base of the OB region 1401 is lost and the quality of image of the valid region is degraded. Therefore, it is possible to suppress the degradation of image quality of the valid region by performing the following countermeasure for the OB region 1401.

As a countermeasure method for the OB region 1401, for example, there are the following two methods.

Figure 15:
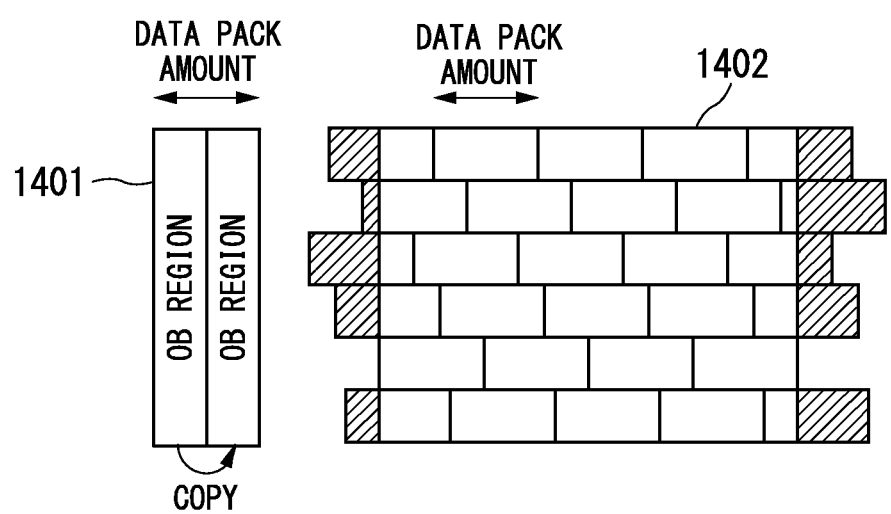
FIG. 15 is a schematic diagram showing an example in which the OB region is copied in a horizontal direction and only the OB region is divided and compressed as one piece of rectangular electric signal data in the second embodiment of the present invention.

(a) The OB region 1401 is copied in the horizontal direction and only the OB region is allowed to be divided as one piece of rectangular electric signal data so that a horizontal width of the OB region 1401 becomes a data pack amount. In addition, in the compression of the valid region 1402, as in the first embodiment, dividing into rectangular electric signal data is randomly performed and the compression is performed for every piece of the rectangular electric signal data. FIG. 15 is a schematic diagram showing an example in which the OB region 1401 is copied in a horizontal direction and only the OB region is divided and compressed as one piece of rectangular electric signal data. Even in this case, it is possible to reduce the load of the compression process and the decompression process because the shapes of all rectangular electric signal data are the same.

Figure 16:
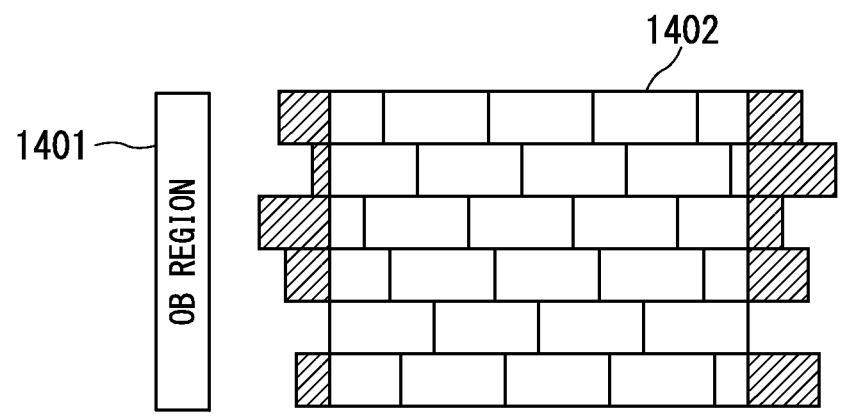
FIG. 16 is a schematic diagram showing an example in which no OB region 1401 is compressed and only a valid region is compressed in the second embodiment of the present invention.

(b) In only the compression of the valid region 1402 without compression on the OB region 1401, as in the first embodiment, dividing into rectangular electric signal data is randomly performed and the compression is performed for every piece of the rectangular electric signal data. FIG. 16 is a schematic diagram showing an example in which no OB region 1401 is compressed and only the valid region 1402 is compressed. Even in this case, it is possible to reduce the load of the compression process and the decompression process because the shapes of the rectangular electric signal data of the valid region 1402 are the same.

Third Embodiment

Next, the third embodiment of the present invention will be described. While an example in which the degradation of image quality is reduced by devising a method of disposing a rectangular image region in a unit of one frame (a unit of one-image data) has been described in the first and second embodiments, a method of compressing a frame constituting a moving image will be described in this embodiment.

Figure 17A:
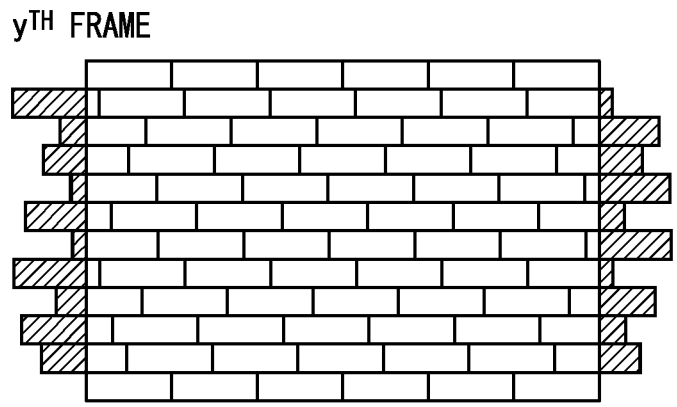
FIG. 17A is a schematic diagram showing an example in which a $y^{th}$ frame is divided into rectangular image data in a third embodiment of the present invention.
Figure 17B:
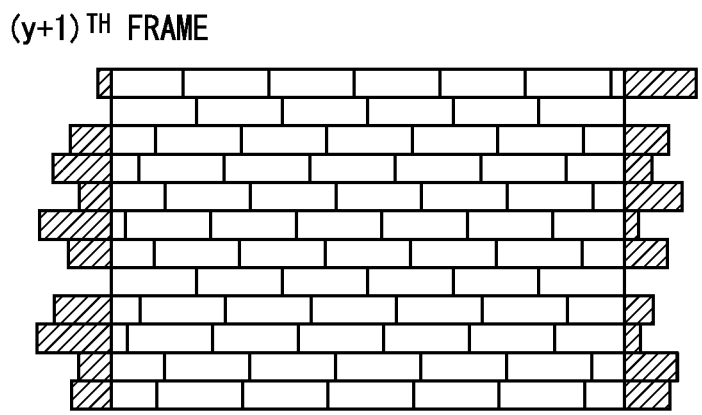
FIG. 17B is a schematic diagram showing an example in which a $(y+1)^{th}$ frame is divided into rectangular image data in the third embodiment of the present invention.
Figure 17C:
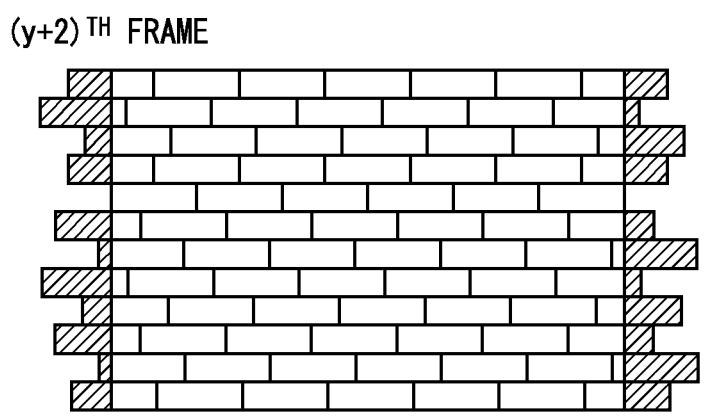
FIG. 17C is a schematic diagram showing an example in which a $(y+2)^{th}$ frame is divided into rectangular image data in the third embodiment of the present invention.

FIGS. 17A to 17C are schematic diagrams showing an example in which each frame is divided into rectangular image data in this embodiment. FIG. 17A shows an example in which a $y^{th}$ frame is divided into rectangular image data. FIG. 17B shows an example in which a $(y+1)^{th}$ frame is divided into rectangular image data. FIG. 17C shows am example in which a $(y+2)^{th}$ frame is divided into rectangular image data.

As shown, each frame is randomly divided into a plurality of pieces of rectangular image data as in the first embodiment. In addition, as shown, in this embodiment, the method of dividing rectangular image data is further varied between frames. For example, positions of dividing into the rectangular image data are different in the $y^{th}$ and $(y+1)^{th}$ frames. In addition, positions of dividing into the rectangular image data are different in the $(y+1)^{th}$ and $(y+2)^{th}$ frames. In this manner, it is also possible to reduce the degradation of image quality between the frames by further varying the method of dividing the rectangular image data between the frames.

For example, as the method of varying the method of dividing the rectangular image data between the frames, there is a method of varying a seed value having parameter information (an offset value and a data pack amount) for determining the dividing position of the rectangular image data for every frame.

Although the first to third embodiments of the present invention have been described above in detail with reference to the drawings, specific configurations are not limited to these embodiments, and a design, etc. may also be included without departing from the scope of the present invention. For example, although the dividing position of the rectangular image data is shifted in the horizontal direction in the above-described embodiment, the present invention is not limited thereto. A dividing position of the rectangular image data may be shifted in the vertical direction.

Figure 18:
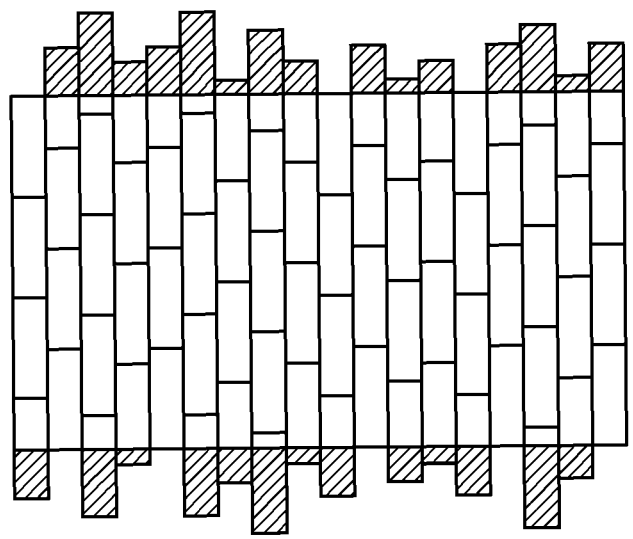
FIG. 18 is a schematic diagram showing an example in which the rectangular image data is shifted in a vertical direction.

FIG. 18 is a schematic diagram showing an example in which the rectangular image data is shifted in the vertical direction. As shown, it is possible to eliminate dense and sparse portions of a boundary position of the rectangular region even when the rectangular image data is shifted in the vertical direction.

In addition, although an example in which image data is divided into a plurality of pieces of rectangular image data and a compression process is performed for every piece of the rectangular image data has been described in the above-described example, the rectangular image data may be a square in which the number of vertical pixels and the number of horizontal pixels are the same such as 10 vertical pixels×10 horizontal pixels, a rectangle in which the number of vertical pixels and the number of horizontal pixels are different such as 2 vertical pixels×3 horizontal pixels, or a rectangle in which there are a plurality of pixels only in a one-dimensional direction such as 1 vertical pixel×10 horizontal pixels.

Figure 19A:
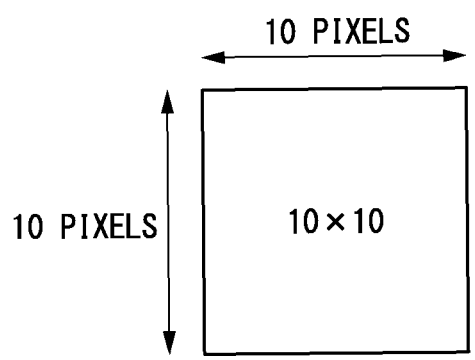
FIG. 19A is a schematic diagram showing an example of the rectangular image data.
Figure 19B:
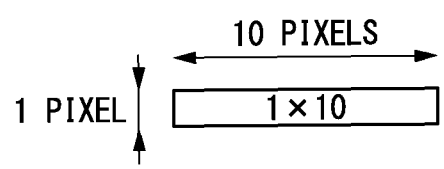
FIG. 19B is a schematic diagram showing an example of the rectangular image data.
Figure 20:
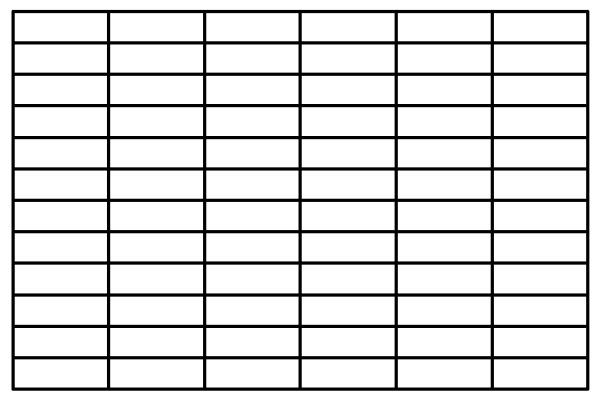
FIG. 20 is a schematic diagram showing a conventionally known example in which a frame is divided into rectangular regions each having 10 pixels×10 pixels and RAW data is compressed for every rectangular region.
Figure 21A:
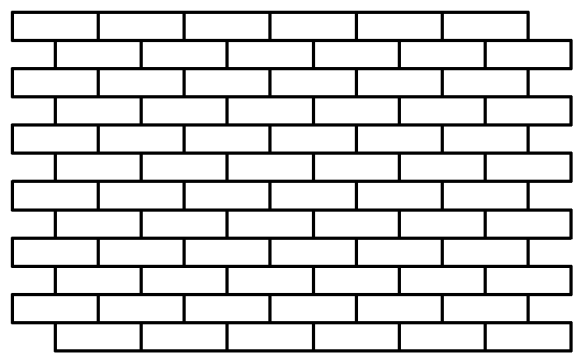
FIG. 21A is a schematic diagram showing a conventionally known example in which a frame is separated into rectangular blocks, every line is alternately shifted in the horizontal direction, and a boundary portion of the rectangle is shifted with a previous line.
Figure 21B:
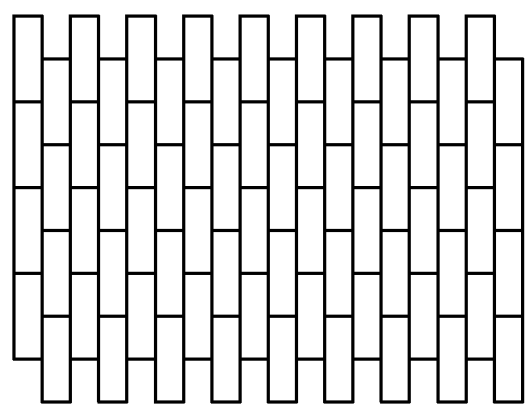
FIG. 21B is a schematic diagram showing a conventionally known example in which a frame is separated into rectangular blocks, every line is alternately shifted in the vertical direction, and a boundary portion of the rectangle is shifted with a previous line.
Figure 22:
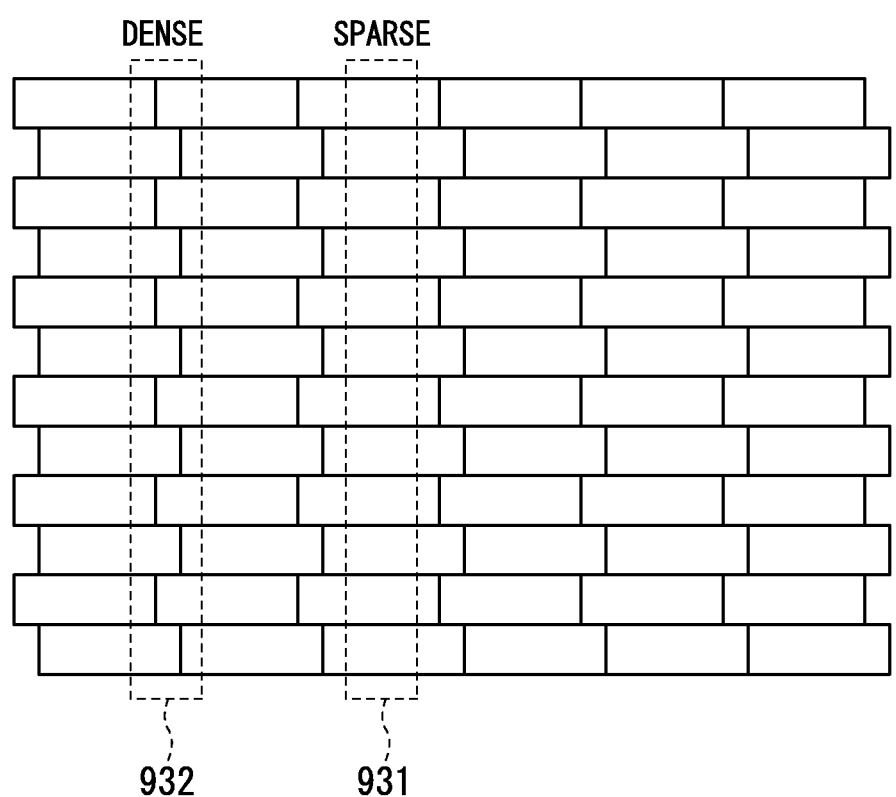
FIG. 22 is a schematic diagram showing a conventionally known example in which there are a dense portion and a sparse portion of the boundary position when the frame is separated into rectangular blocks by alternately shifting every line in the horizontal direction.

FIGS. 19A and 19B are schematic diagrams showing examples of the rectangular image data. FIG. 19A is a schematic diagram showing rectangular image data of 10 vertical pixels×10 horizontal pixels. FIG. 19B is a schematic diagram showing rectangular image data of 1 vertical pixel×10 horizontal pixels.

All or some of the functions of the sections provided in the above-described image compressing apparatuses 200 and 500 and all or some of the functions of the sections provided in the above-described image decompressing apparatuses 300 and 600 may be implemented by recording a program for implementing the functions on a computer-readable recording medium and causing a computer system to read and execute the program recorded on the recording medium. Also, the "computer system" used here is assumed to include an operating system (OS) and hardware such as peripheral devices.

In addition, the "computer-readable recording medium" refers to a storage section, including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. In addition, the above-described program may be used to implement some of the above-described functions. Further, the program may implement the above-described functions in combination with a program already recorded on the computer system.

The present invention is not to be considered as being limited by the foregoing description, and is only limited by the scope of the appended claims.

What is claimed is:

1. An image processing apparatus comprising:
   a dummy region adding section configured to add a dummy region to an end part of image data;
   a dividing position determining section configured to randomly determine a dividing position at which the image data is divided into a plurality of pieces of rectangular image data having the same shape;
   a dividing section configured to divide the image data into the plurality of pieces of rectangular image data based on the dividing position determined by the dividing position determining section; and
   a compressing section configured to compress the plurality of pieces of rectangular image data obtained through a dividing operation of the dividing section.

2. The image processing apparatus according to claim 1, wherein the dummy region adding section adds the dummy region using peripheral pixel data output by an imager.

3. The image processing apparatus according to claim 2, wherein the dummy region adding section adds the dummy region using the image data near the dummy region.

4. The image processing apparatus according to claim 1, wherein the dummy region adding section adds the dummy region using a fixed value.

5. The image processing apparatus according to claim 1,
   wherein the dummy region adding section adds the dummy region using an optical black region of an imager, and
   wherein the compressing section does not compress the dummy region.

6. The image processing apparatus according to claim 1,
   wherein the image data is a frame constituting a moving image, and
   wherein the dividing position determining section randomly determines the dividing position for every frame.

7. The image processing apparatus according to claim 1, further comprising:
   a decompressing section configured to decompress compressed rectangular image data compressed after dividing image data into a plurality of pieces of rectangular image data; and
   an image data restoration section configured to generate the image data after deleting a dummy region from the plurality of pieces of rectangular image data decompressed by the decompressing section, the dummy region having been added to an end part of the image data before a compression process is performed on the image data.

8. The image processing apparatus according to claim 1, further comprising:
   a decompressing section configured to decompress compressed rectangular image data compressed after adding a dummy region to an end part of image data and dividing the image data into a plurality of pieces of rectangular image data; and
   an image data restoration section configured to generate the image data after deleting the dummy region from the plurality of pieces of rectangular image data decompressed by the decompressing section.

* * * * *